United States Patent [19]

vanden Boogaart

[11] Patent Number: 5,063,724

[45] Date of Patent: Nov. 12, 1991

[54] ANCHOR FOR FIXING ROD IN CONCRETE AND THE LIKE

[76] Inventor: Robert W. vanden Boogaart, Mezenlaan, 4 N1-5130 Zaltbommel, Netherlands

[21] Appl. No.: 279,945

[22] Filed: Dec. 5, 1988

[51] Int. Cl.$^5$ ............................................. E21D 20/02
[52] U.S. Cl. ........................................ 52/704; 52/698; 405/259.5; 405/259.6
[58] Field of Search .................. 405/261, 266, 260; 52/659, 698, 704; 220/219, 220; 106/99

[56] References Cited

U.S. PATENT DOCUMENTS

| | | | |
|---|---|---|---|
| 1,318,584 | 10/1919 | Peirce | 52/659 X |
| 3,774,683 | 11/1923 | Smith et al. | 405/266 X |
| 3,921,800 | 11/1975 | Burns | 405/261 X |
| 3,930,639 | 1/1976 | Steinberg et al. | 405/261 X |
| 4,133,928 | 1/1979 | Riley et al. | 52/659 X |
| 4,159,911 | 7/1979 | Takazuka | 106/99 |
| 4,516,884 | 5/1985 | Douty | 405/261 |
| 4,518,290 | 5/1985 | Frichmann et al. | 405/261 X |
| 4,616,050 | 10/1986 | Simmons et al. | 405/261 X |
| 4,706,806 | 11/1987 | Mauthe | 405/261 X |

FOREIGN PATENT DOCUMENTS 8808256  9/1988  Fed. Rep. of Germany.

OTHER PUBLICATIONS

Moore Catalog (Oct., 1986).

Primary Examiner—Dennis L. Taylor
Attorney, Agent, or Firm—Fish & Richardson

[57] ABSTRACT

The invention proposes the improvement of the force transfer between an anchor rod introduced into a borehole in concrete, artificial stone or other rock, which is held by a composite material and the concrete or rock mass adjacent to the borehole, whereby elongated metal elements, preferably steel needles, are introduced in irregular layer form at least into an undercut grip area of the composite material and a suitable composite material is formed by incorporating steel needles into it.

35 Claims, 3 Drawing Sheets

ANCHOR FOR FIXING ROD IN CONCRETE AND THE LIKE

BACKGROUND OF THE INVENTION

The invention relates to fixing anchor rods in concrete, rock and the like.

Typically, for producing an anchored rod in a concrete surface, a borehole is made, a composite material, e.g. a composite material cartridge, is introduced into the hole and the anchor rod inserted.

Various procedures are known for fixing of anchor rods, such as, e.g. threaded rods in boreholes made in concrete, artificial stone or other rock. These procedures include introduction of purely mechanically held straddling dowels or the like. So-called composite or compound dowel systems also exist, in which a composite material cartridge is introduced into a borehole (which may be undercut for improved retaining action). The composite material may be in a cartridge, e.g. glass, and consist of a hardenable composite material, optionally in the form of two separate components which are mixed and then harden or set. After the introduction of the cartridge, the anchor rod is inserted, breaking the cartridge, and the setting of the composite material is brought about, optionally through mixing of the two components. Following setting or hardening, the anchor rod can be placed under load.

An objective of the present invention is to increase the bearing capacity and safety level of such anchors, particularly in the case of shorter anchor rod grip heights in the preferably undercut area of a borehole.

SUMMARY OF THE INVENTION

According to the invention, a method for fixing anchors rods comprises introducing, at least in a grip area of the composite material, elongated metal elements, and in particular steel needles, in irregular layer form. Through the incorporation of steel needles into the composite material, the anchor is reinforced and in particular additional force transfer paths are created between the anchor rod and the concrete, rock or the like material surrounding the borehole. As a result of the irregular layer form of the needles, it is in particular ensured that adequate numbers of needles are arranged in such a way that they are directed inwards from the borehole boundary in the insertion direction of the anchor rod, so that, in particular, tensile forces exerted on the rods are counteracted. Fixing is in particular assisted in that the needles are generally arranged in sector-like manner and not radially, so that in the particular case of a threaded rod, the latter can be supported with the flanks of its thread depressions with respect to needles extending in the wall area bounding the borehole. This preferred construction is particularly assisted by the fact that the needles are introduced with a length of the same order of magnitude as the cross-section of the anchor rod diameter and/or needles with lengths which are, at the most, the length of a circular sector of a cross-section through the borehole in the vicinity of the largest undercut dimension in contact with an anchor rod inserted in the borehole. As stated, the length of the needles is preferably dependent on the diameter of the borehole or the anchor rod to be introduced and is consequently approximately between 4 and 25 mm, preferably in the range 5 to 8 mm. Whereas in principle the needles can be introduced into the borehole before or after the composite material, according to a particularly preferred embodiment, the steel needles are introduced together with the composite material. The invention therefore further proposes a composite material for fixing anchor rods in concrete, particularly in the form of a composite material cartridge, in which elongated metal elements, and in particular steel needles, are incorporated into the composite material. In this case, for dimensioning the length of the steel needles, it is also possible to make use of the cartridge diameter, so that the length of the steel needles is of the same order of magnitude as the cartridge diameter and in particular the length of the steel needles corresponds to the cartridge diameter. It is also proposed that the composite comprise an aggregate of stone, in particular quartz, and that the aggregate be introduced in two segments, a first segment being disposed in the undercut region and being of a consistency that is relatively more coarse than a second segment of aggregate. Preferably the quartz aggregate and steel needles are introduced together in a cartridge.

The inventive use of steel needles considerably reinforces the mass of the hardenable composite material, such as hardenable plastic, and the load carrying capacity of dowels, anchor rods and reinforcements in concrete, rock and the like is significantly increased. A particular advantage of the invention is that shorter grip heights of the anchor rods are achieved, particularly in the undercut area in the case of an identical or higher load carrying capacity and in particular subsequent connections or bridges between the anchor rod and the surrounding material, such as concrete or rock, can be made deep in the borehole. Compared with known composite dowel systems, this leads to much greater safety level and bearing capacity, particularly in the area of previously concreted-in anchors, which is not performable in many cases with concrete, but is in principle possible in rock or stone, such as in tunnels or the like. The invention offers a completely equivalent alternative here. The admissible load carrying capacity of the anchor is in particular ensured in the case of small cracks in the concrete, which would otherwise always be problematical. Thus the invention offers a combination of the advantages of composite and mechanical dowels.

Further advantages and features of the invention can be gathered from the claims and the following description, which illustrate in detail an embodiment of the invention with reference to the drawings.

PREFERRED EMBODIMENT

FIG. 1 is a side section view of a drill hole formed in concrete, rock or the like;

FIGS. 2 and 2A are side views, partially in section, of a drilling apparatus for boring undercut drill holes, while FIG. 2A shows the apparatus in use for forming an undercut hole;

FIG. 4 is a side view of the cartridge of FIG. 3 being placed in the undercut hole, e.g. of FIG. 2a;

Figure 1:
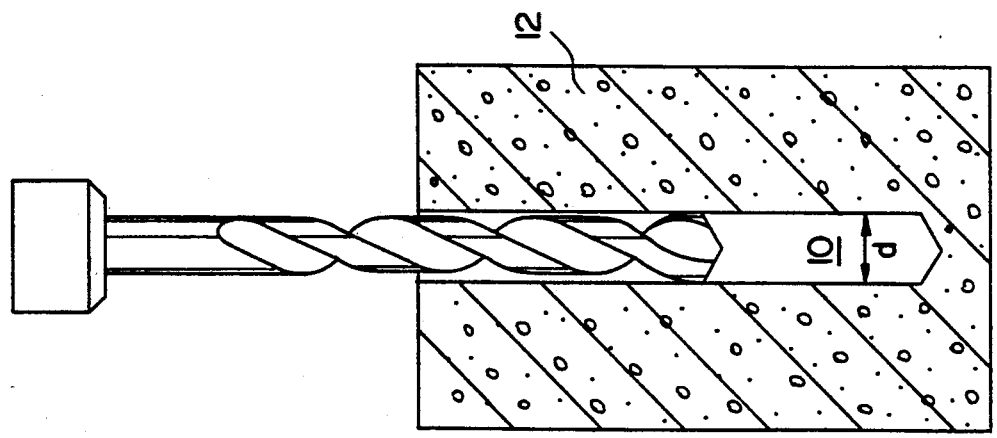
Figure 2A:
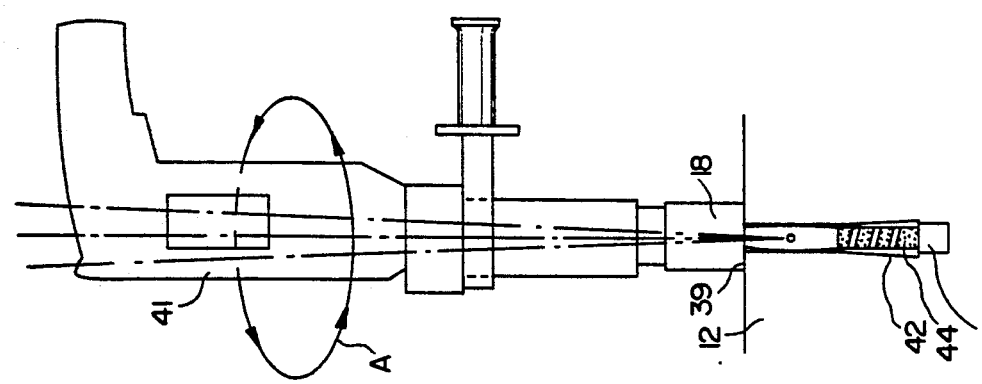
Figure 2:
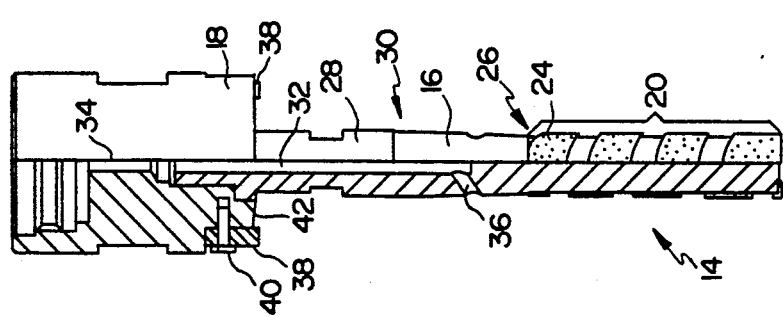

Referring to FIG. 1, a drill hole 10 with a given diameter, d, is drilled in concrete, rock or the like 12. An apparatus 14 (FIG. 2), as described in German Patent Application No. 8,808,256, the disclosure of which is incorporated herein by reference, having a mandrel 16, is fixed in a drilling machine adaptor 18. Mandrel 16 has a widened area 20 conically widening towards its free end 22 and whose outer surface is roughened and is preferably provided with a diamond section 24. In the represented embodiment the diamond section 24 is helically applied to the widened area 20. (Diamond section 24 can be fixed galvanically or by sintering on mandrel 16.) The area between the narrowest point 26 and the adaptor 18 is constructed in the form of a convex double cone 28, which consequently widens in frustum-shaped manner from the adaptor 18 to a maximum circumference central area 30 and then tapers again to the tapered transition point 26 to the widened area 20. Mandrel 16 and adaptor 18 have channels 32,34 for supplying cooling liquid to the working area of the apparatus 10 defined by the widened area 20. Channels 32,34 are largely axial or at least axially parallel. Channel 32 in mandrel 16 terminates in the retapering area of double cone 28 through an opening 36 leading in inclined manner to the side. Carbide tips 38 are fixed, e.g. to the circumference of adaptor 18, in diagonally-facing manner by means of fastening screws 40, and extend over and beyond the end face 42 facing the free end 22 of mandrel 16.

Figure 4:
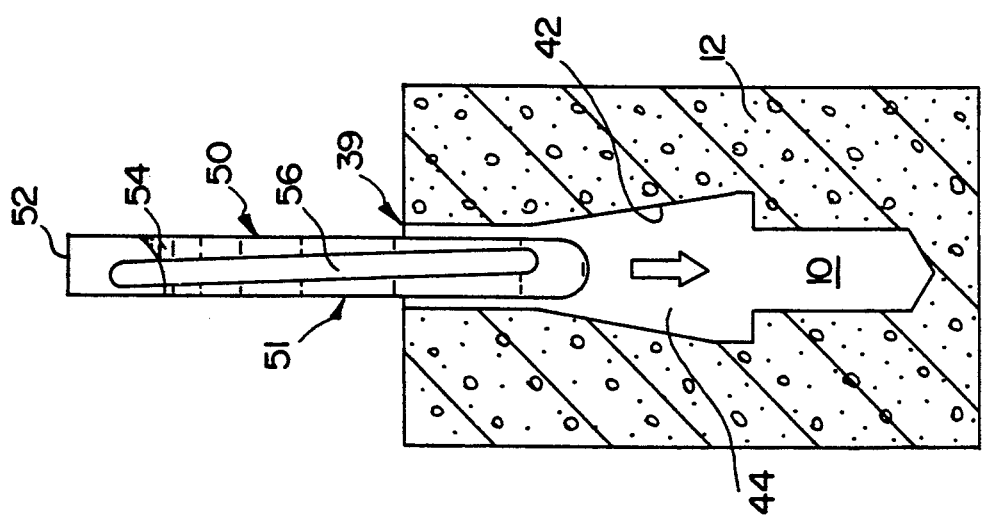

The maximum external diameter of the mandrel corresponds to the diameter of the drill hole 10, while the diameter of mandrel 16 at its free end face 22 and in the widened area 30 of double cone 28 is the same. Accompanied by the cooling liquid supplied via channels 32,34 and outlet 36, the apparatus is rotated by means of the drilling machine 41. Simultaneously a gyroscopic movement is imparted to the drilling machine, i.e. a simultaneous rotating and tilting movement, and its shaft or axis is moved on a cone, the centre of rotation of the rotary movement being determined through the plane of the widened area 30 of the double cone camber 28 of mandrel 16, as can be seen at A in FIG. 2A. As a result of this movement the free, widening end 20 of the mandrel is pressed against the side wall 42 of drill hole 10 and, as a result of its rotary movement and its roughened, particularly diamond section-equipped exterior, grinds a widening frustum cavity 44 over and beyond the diameter of the original drill hole 10 and towards the inner end thereof, with shoulder 45. Thus, it is possible to easily make an undercut drill hole 10,44 (FIG. 4) in concrete or rock.

The carbide tips on the end face of the adaptor facing the free end of the mandrel are pressed during the widening in the drill hole against the front wall of the part in which the drill hole is made and, as a result of the adaptor rotation, mill therein a control ring 39, which also subsequently makes it possible, if e.g. a dowel, tie rod, etc. is inserted and fixed in the drill hole, to establish that drill hole has been provided with an undercut.

Dust and loose particles are removed from the hole, e.g., but means of a jet of air. A chemical anchor cartridge 50 (FIG. 3) containing a composite material 51 is placed in the now undercut borehole 10.

Figure 3:
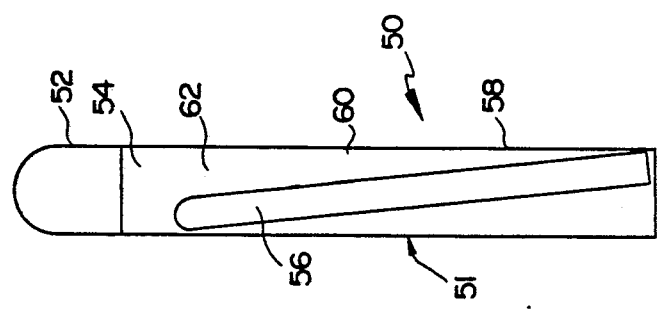
FIG. 3 is a side view of a composite chemical anchor cartridge of the invention.

Referring to FIG. 3, the anchor cartridge 50 consists of a glass capsule 52 containing a liquid 54 resin and an ampule 56 of catalyst (hardener), the resin and catalyst on being mixed, the resin becoming solid. In one preferred embodiment, the resin is polyester and the catalyst is di-benzoyl peroxide. Also disposed within the capsule are elongated metal elements, e.g. steel needles 58, and quartz aggregate, preferably consisting of two segments including a coarse material 60 and a relatively finer quartz aggregate 62.

Figures 6, 6A:
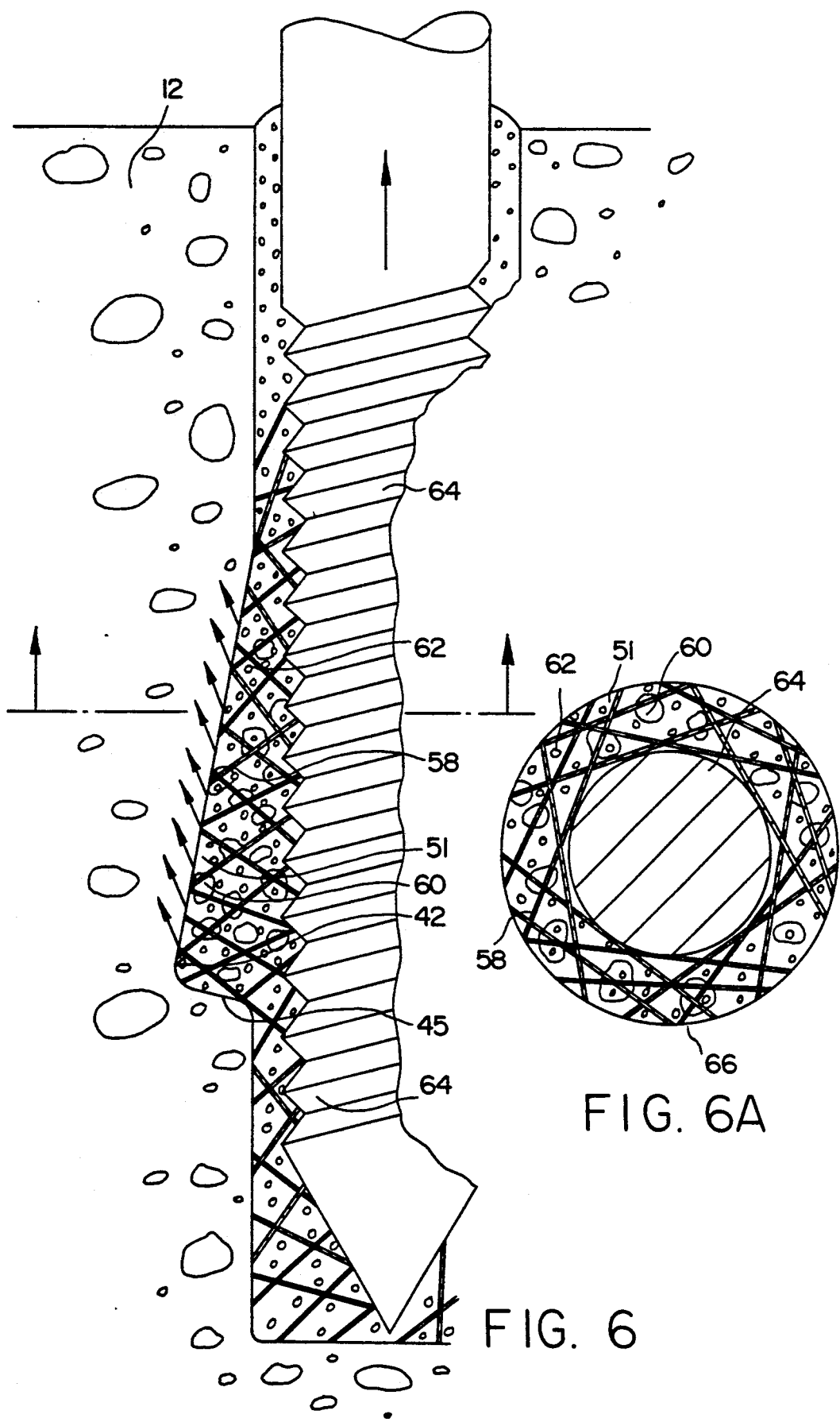
FIG. 6 is a side view, partially in section, of the borehole with the rod anchored in place by the composite material of the invention.
FIG. 6A is a top section view taken at the line 6A–6A of FIG. 6.

The steel needles 58 are preferably 0.3 to 1 mm thick. The length of the needles generally corresponds approximately to the diameter of anchor rod 64 and in the preferred embodiment the length of the steel needles 58 roughly corresponds to the length of a circular sector 66 touching the inserted anchor rod 64 and which divides off a circular portion of borehole 10 in the vicinity of the greatest width of undercut cavity 44, as shown in FIG. 6.

Figure 5:
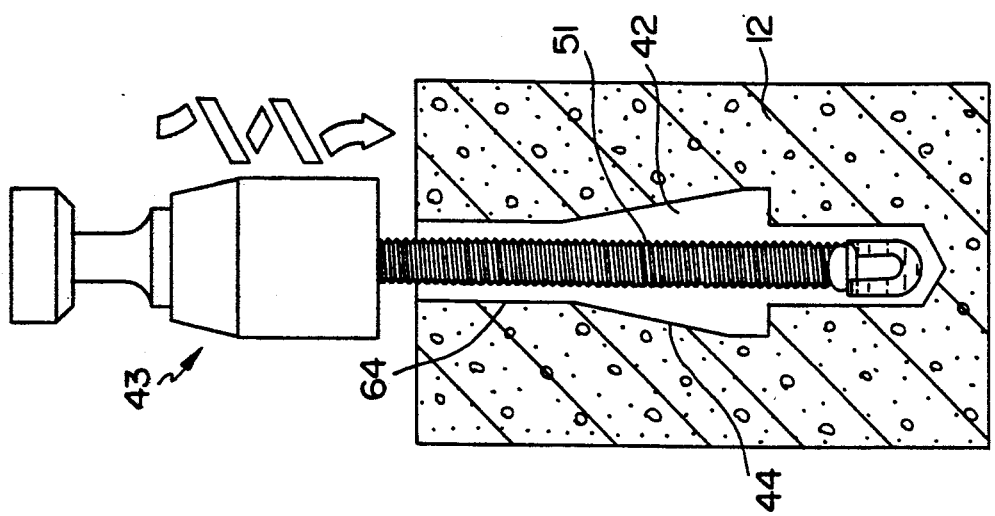
FIG. 5 is a similar view of the hole during placement of the anchor.

An anchor rod, in the represented embodiment a threaded rod 64, is introduced forcefully into the borehole 10 (FIG. 5), destroying the glass capsule 52 of the composite material cartridge 50 so that the composite material 51 can mix with the components thereof and set. (This may be assisted by turning or screwing the anchor rod 64, e.g. via drill and adapter 43.) The steel needles 58 are already in an irregular layer form in the composite cartridge and this is further reinforced during the penetration of anchor rod 64 into borehole 10, so that, before the composite material 51 has had an opportunity to set, they are in an irregular layer, as can be gathered from the drawings (FIGS. 6 and 6A ). The composite material 51 is then hardened or set in per se known manner. The steel needles lead to a force transfer from anchor rod 64 to the material of the surrounding concrete 12, in which the borehole 10 is made, so that a greater safety level and carrying capacity and therefore an improvement to the anchoring are achieved.

Other embodiments are with the following claims.

What is claimed is:

1. Hardenable composite material for fixing an anchor rods with surface projections in a borehole bounded by a wall, characterized in that elongated metal elements are incorporated within said composite material, said elongated metal elements comprising a multiplicity of rigid needles having opposite ends with an intermediate portion therebetween, said needles being of sufficient length and orientation within said composite material within said borehole that said opposite ends of at least some said needles are in contact with the wall while said intermediate portions of at least some of said needles are in contact with the anchor rod, to provide force transfer paths from the anchor rod to the wall.

2. The hardenable composite material according to claim 1, characterized in that the lengths of said rigid needles are of the same order of magnitude as a diameter of a cartridge containing said hardenable composite material.

3. The hardenable composite material according to claim 2, characterized in that the lengths of said rigid needles correspond to a diameter of a cartridge containing said hardenable composite material.

4. The hardenable composite material according to one of the claims 1 to 3, characterized in that the lengths of said rigid needles at the most correspond to the length of a circular sector of a cross-section of the borehole in contact with the anchor rod introduced into said borehole in the vicinity of the largest radial extension of an undercut of the borehole in the latter.

5. The hardenable composite material according to one of the claims 1 to 3, characterized in that the lengths of said rigid needles are between 4 and 25 mm.

6. The hardenable composite material according to claim 2, characterized in that the lengths of said rigid needles are between 5 and 16 mm.

7. The composite material according to one of claims 1 to 3, characterized in that said sufficient length of rigid needles comprises a plurality of lengths.

8. The hardenable composite material according to one of the claims 1 to 3 characterized in that the diameters of said rigid needles are in the range of 0.2 to 1 mm.

9. The hardenable composite material according to claim 8, characterized in that the diameters of said rigid needles are preferably in the range of 0.3 to 0.8 mm.

10. The hardenable composite material of claim 1, further comprising an aggregate of stone.

11. The hardenable composite material of claim 10 characterized in that said aggregate comprises at least a first segment and a second segment, said first segment having consistency relatively finer than the consistency of said second segment.

12. A method for fixing an anchor rod with surface projections in a borehole bounded by a wall, comprising
  making a borehole bounded by a wall,
  providing a hardenable composite material characterized in that elongated metal elements are incorporated within said composite material, said elongated metal elements comprising a multiplicity of rigid needles having opposite ends with an intermediate portion therebetween, said needles of sufficient length and orientation within said composite material within said borehole that said opposite ends of at least some said needles are in contact with said wall while said intermediate portions of at least some of said needles are in contact with said anchor rod, to provide force transfer paths from said anchor rod to said wall,
  introducing said hardenable composite material in said borehole,
  inserting said anchor rod in said borehole in a manner that said opposite ends of at least some said needles contact said wall while said intermediate portions of at least some of said needles contact said anchor rod, and
  allowing said hardenable composite material to harden prior to loading said anchor rod.

13. The method of claim 12, wherein said step of making a borehole comprising forming an undercut drill hole, and further comprising placing said hardenable composite material containing said rigid needles in said undercut drill hole.

14. A method for fixing an anchor rod with surface projections in a borehole bounded by a wall, comprising
  making a borehole bounded by a wall,
  providing a hardenable composite material characterized in that elongated metal elements are incorporated within said composite material, said elongated metal elements comprising a multiplicity of rigid needles having opposite ends with an intermediate portion therebetween, said needles of lengths of the same order of magnitude as the cross-section of said anchor rod and orientation within said composite material within said borehole that said opposite ends of at least some said needles are in contact with said wall while said intermediate portions of at least some of said needles are in contact with said anchor rod, to provide force transfer paths from said anchor rod to said wall,
  introducing said hardenable composite material in said borehole,
  inserting said anchor rod in said borehole in a manner that said opposite ends of at least some said needles contact said wall while said intermediate portions of at least some of said needles contact said anchor rod, and
  allowing said hardenable composite material to harden prior to loading said anchor rod.

15. The method of claim 14, wherein said step of making a borehole includes forming an undercut drill hole, and further comprising introducing said hardenable composite material containing said rigid needles in said undercut drill hole.

16. A method for fixing an anchor rod with surface projections in a borehole bounded by a wall, comprising
  making a borehole bounded by a wall,
  providing a hardenable composite material characterized in that elongated metal elements are incorporated within said composite material, said elongated metal elements comprising a multiplicity of rigid needles having opposite ends with an intermediate portion therebetween, said needles of lengths corresponding to the diameter of said anchor rod and orientation within said composite material within said borehole that said opposite ends of at least some said needles are in contact with said wall while said intermediate portions of at least some of said needles are in contact with said anchor rod, to provide force transfer paths from said anchor rod to said wall,
  introducing said hardenable composite material in said borehole,
  inserting said anchor rod in said borehole in a manner that said opposite ends of at least some said needles contact said wall while said intermediate portions of at least some of said needles contact said anchor rod, and
  allowing said hardenable composite material to harden prior to loading said anchor rod.

17. The method of claim 16, wherein said step of making a borehole includes forming an undercut drill hole, and further comprising introducing said hardenable composite material containing said rigid needles in said undercut drill hole.

18. A method for fixing an anchor rod with surface projections in a borehole bounded by a wall, comprising
  making a borehole bounded by a wall,
  providing a hardenable composite material characterized in that elongated metal elements are incorporated within said composite material, said elongated metal elements comprising a multiplicity of rigid needles having opposite ends with an intermediate portion therebetween, said needles of lengths which at the maximum correspond to the length of a circular sector of a cross-section through a borehole in contact with said anchor rod inserted in said borehole in the vicinity of the greatest diameter of said borehole and orientation within said composite material within said borehole that said opposite ends of at least some said needles are in contact with said wall while said intermediate portions of at least some of said needles are in contact with said anchor rod, to provide force transfer paths from said anchor rod to said wall,
  introducing said hardenable composite material in said borehole,
  inserting said anchor rod in said borehole in a manner that said opposite ends of at least some said needles contact said wall while said intermediate portions of at least some of said needles contact said anchor rod, and allowing said hardenable composite material to harden prior to loading said anchor rod.

19. The method of claim 18, wherein said step of making a borehole includes forming an undercut drill hole, and further comprising introducing said hardenable composite material containing said rigid needles in said undercut drill hole.

20. A method for fixing an anchor rod with surface projections in a borehole bounded by a wall, comprising
making a borehole bounded by a wall,
providing a hardenable composite material characterized in that elongated metal elements are incorporated within said composite material, said elongated metal elements comprising a multiplicity of rigid needles having opposite ends with an intermediate portion therebetween, said needles of lengths between 4 and 25 mm and orientation within said composite material within said borehole that said opposite ends of at least some said needles are in contact with said wall while said intermediate portions of at least some of said needles are in contact with said anchor rod, to provide force transfer paths from said anchor rod to said wall,
introducing said hardenable composite material in said borehole,
inserting said anchor rod in said borehole in a manner that said opposite ends of at least some said needles contact said wall while said intermediate portions of at least some of said needles contact said anchor rod, and
allowing said hardenable composite material to harden prior to loading said anchor rod.

21. The method of claim 20, wherein said step of making a borehole includes forming an undercut drill hole, and further comprising introducing said hardenable composite material containing said rigid needles in said undercut drill hole.

22. A method for fixing an anchor rod with surface projections in a borehole bounded by a wall, comprising
making a borehole bounded by a wall,
providing a hardenable composite material characterized in that elongated metal elements are incorporated within said composite material, said elongated metal elements comprising a multiplicity of rigid needles having opposite ends with an intermediate portion therebetween, said needles of lengths between 5 and 16 mm and orientation within said composite material within said borehole that said opposite ends of at least some said needles are in contact with said wall while said intermediate portions of at least some of said needles are in contact with said anchor rod, to provide force transfer paths from said anchor rod to said wall,
introducing said hardenable composite material in said borehole,
inserting said anchor rod in said borehole in a manner that said opposite ends of at least some said needles contact with wall while said intermediate portions of at least some of said needles contact said anchor rod, and
allowing said hardenable composite material to harden prior to loading said anchor rod.

23. The method of claim 22, wherein said step of making a borehole includes forming an undercut drill hole, and further comprising introducing said hardenable composite material containing said rigid needles in said undercut drill hole.

24. A method of fixing an anchor rod with surface projections in a borehole bounded by a wall, comprising
making a borehole bounded by a wall,
providing a hardenable composite material characterized in that elongated metal elements are incorporated within said composite material, said elongated metal elements comprising a multiplicity of rigid needles having opposite ends with an intermediate portion therebetween, said needles of different lengths, i.e. with a length distribution over the corresponding length range, and orientation within said composite material within said borehole that said opposite ends of at least some said needles are in contact with said wall while said intermediate portions of at least some of said needles are in contact with said anchor rod, to provide force transfer paths from said anchor rod to said wall,
introducing said hardenable composite material in said borehole,
inserting said anchor rod in said borehole in a manner that said opposite ends of at least some said needles contact said wall while said intermediate portions of at least some of said needles contact said anchor rod, and
allowing said hardenable composite material to harden prior to loading said anchor rod.

25. The method of claim 24, wherein said step of making a borehole includes forming an undercut drill hole, and further comprising introducing said hardenable composite material containing said rigid needles in said undercut drill hole.

26. A method for fixing an anchor rod with surface projections in a borehole bounded by a wall, comprising
making a borehole bounded by a wall,
providing a hardenable composite material characterized in that elongated metal elements are incorporated within said composite material, said elongated metal elements comprising a multiplicity of rigid needles having opposite ends with an intermediate portion therebetween, said needles with diameters in the range of 0.2 to 1 mm and of sufficient length and orientation within said composite material within said borehole that said opposite ends of at least some said needles are in contact with said wall while said intermediate portions of at least some of said needles are in contact with said anchor rod, to provide force transfer paths from said anchor rod to said wall,
introducing said hardenable composite material in said borehole,
inserting said anchor rod in said borehole in a manner that said opposite ends of at least some said needles contact said wall while said intermediate portions of at least some of said needles contact said anchor rod, and
allowing said hardenable composite material to harden prior to loading said anchor rod.

27. The method of claim 26, wherein said step of making a borehole includes forming an undercut drill hole, and further comprising introducing said hardenable composite material containing said rigid needles in said undercut drill hole.

28. A method for fixing an anchor rod with surface projections in a borehole bounded by a wall, comprising
making a borehole bounded by a wall, providing a hardenable composite material characterized in that elongated metal elements are incorporated within said composite material, said elongated metal elements comprising a multiplicity of rigid needles having opposite ends with an intermediate portion therebetween, said needles with diameters in the range of 0.3 to 0.8 mm and of sufficient length and orientation within said composite material within said borehole that said opposite ends of at least said needles are in contact with said wall while said intermediate portions of at least some of said needles are in contact with said anchor rod, to provide force transfer paths from said anchor rod to said wall, introducing said hardenable composite material in said borehole, inserting said anchor rod in said borehole in a manner that said opposite ends of at least some said needles contact said wall while said intermediate portions of at least some of said needles contact said anchor rod, and allowing said hardenable composite material to harden prior to loading said anchor rod.

29. The method of claim 28, wherein said step or making a borehole includes forming an undercut drill hole, and further comprising introducing said hardenable composite material containing said rigid needles in said undercut drill hole.

30. A method for fixing an anchor rod with surface projections in a borehole bounded by a wall, comprising making a borehole bounded by a wall, providing a hardenable composite material characterized in that stone aggregate and elongated metal elements are incorporated within said composite material, said elongated metal elements comprising a multiplicity of rigid needles having opposite ends with an intermediate portion therebetween, said needles of sufficient length and orientation within said composite material within said borehole that said opposite ends of at least some said needles are in contact with said wall while said intermediate portions of at least some of said needles are in contact with said anchor rod, to provide force transfer paths from said anchor rod to said wall, introducing said hardenable composite material in said borehole, inserting said anchor rod in said borehole in a manner that said opposite ends of at least some said needles contact said wall said intermediate portions of at least some of said needles contact said anchor rod, and allowing said hardenable composite material to harden prior to loading said anchor rod.

31. The method of claim 30, wherein said step of making a borehole includes forming an undercut drill hole, and further comprising introducing said hardenable composite material containing said rigid needles in said undercut drill hole.

32. A method for fixing an anchor rod with surface projections in a borehole bounded by a wall, comprising making a borehole bounded by a wall, providing a hardenable composite material characterized in that stone aggregate and elongated metal elements are incorporated within said composite material, said stone aggregate comprising a first segment and a second segment, said first segment of a consistency relatively more coarse that the consistency of said second segment, and said elongated metal elements comprising a multiplicity of rigid needles having opposite ends with an intermediate portion therebetween, said needles of sufficient length and orientation within said composite material within said borehole that said opposite ends of at least some said needles are in contact with said wall while said intermediate portions of at least some of said needles are in contact with said anchor rod, to provide force transfer paths from said anchor rod to said wall, introducing said hardenable composite material in said borehole, inserting said anchor rod in said borehole in a manner that said opposite ends of at least some said needles contact said wall while said intermediate portions of at least some of said needles contact said anchor rod, and allowing said hardenable composite material to harden prior to loading said anchor rod.

33. The method of claim 32, wherein said step of making a borehole includes forming an undercut drill hole, and further comprising introducing said hardenable composite material containing said rigid needles in said undercut drill hole.

34. Composite material for fixing an anchor rod with surface projections in a borehole bounded by a wall, characterized in that elongated metal elements are incorporated within said composite material, said elongated metal elements comprising a multiplicity of rigid needles having opposite ends with an intermediate portion therebetween, said needles being of sufficient length and orientation within said composite material within said borehole that said opposite ends of at least some said needles are in contact with the wall while said intermediate portions of at least some of said needles are in contact with the anchor rod, to provide force transfer path from the anchor rod to the wall.

35. Hardenable composite material for fixing an anchor rod with surface projections in a borehole bounded by a wall, characterized in that elongated metal elements are incorporated within said composite material, said elongated metal elements comprising a multiplicity of rigid needles having opposite first and second ends with an intermediate portion therebetween, said needles being of sufficient length and orientation within said composite material within said borehole that said first ends of at least some said needles are in contact with the wall while said second ends or said intermediate portions of at least some of said needles are in contact with the anchor rod, to provide force transfer paths from the anchor rod to the wall.

* * * * *

UNITED STATES PATENT AND TRADEMARK OFFICE
CERTIFICATE OF CORRECTION

PATENT NO.   : 5,063,724

DATED        : November 12, 1991

INVENTOR(S)  : Robert W. vanden Boogaart

It is certified that error appears in the above-identified patent and that said Letters Patent is hereby corrected as shown below:

On the title page:

[30]    Foreign Application Priority Date
        December 5, 1987 Fed. Rep. of Germany..  3741320.

Signed and Sealed this

Twenty-seventh Day of April, 1993

*Attest:*

MICHAEL K. KIRK

*Attesting Officer*          Acting Commissioner of Patents and Trademarks